No. 662,153. Patented Nov. 20, 1900.
E. SAUERMILCH.
APPARATUS FOR MEASURING TEXTILES AND RECORDING SALES, &c.
(Application filed May 11, 1898.)
(No Model.) 7 Sheets—Sheet 1.

FIG. 1.

WITNESSES:

INVENTOR
Emil Sauermilch
BY
ATTORNEYS.

No. 662,153. Patented Nov. 20, 1900.
E. SAUERMILCH.
APPARATUS FOR MEASURING TEXTILES AND RECORDING SALES, &c.
(Application filed May 11, 1898.)
(No Model.) 7 Sheets—Sheet 2.

WITNESSES:
INVENTOR
Emil Sauermilch
BY
ATTORNEYS.

No. 662,153. Patented Nov. 20, 1900.
E. SAUERMILCH.
APPARATUS FOR MEASURING TEXTILES AND RECORDING SALES, &c.
(Application filed May 11, 1898.)
(No Model.) 7 Sheets—Sheet 3.

WITNESSES:

INVENTOR
Emil Sauermilch
BY
ATTORNEYS.

UNITED STATES PATENT OFFICE.

EMIL SAUERMILCH, OF NEW YORK, N. Y.

APPARATUS FOR MEASURING TEXTILES AND RECORDING SALES, &c.

SPECIFICATION forming part of Letters Patent No. 662,153, dated November 20, 1900.

Application filed May 11, 1898. Serial No. 680,357. (No model.)

*To all whom it may concern:*

Be it known that I, EMIL SAUERMILCH, a citizen of the United States, residing at New York, borough of Queens, State of New York, have invented certain new and useful Improvements in Apparatus for Measuring off Textile Fabrics and Computing and Registering the Sales of the Same, of which the following is a specification.

This invention relates to an improved apparatus of that class by which textile fabrics of various kinds may be quickly measured off to any length and their price computed and registered, so that an effective control on the salesmen in dry-goods and other stores is obtained; and the invention consists of an apparatus for measuring textile fabrics and computing and registering the sales of the same, which comprises means for measuring off the required length of fabric desired, means for cutting off the required length of fabric, means for computing the price of the length of fabric cut off, and means for continuously registering the total amount of the sales and the total number of yards of fabric sold.

The invention consists, further, in certain details of construction for carrying out the different operations referred to.

In the accompanying drawings.

Similar letters of reference indicate corresponding parts.

Figures 3, 4:
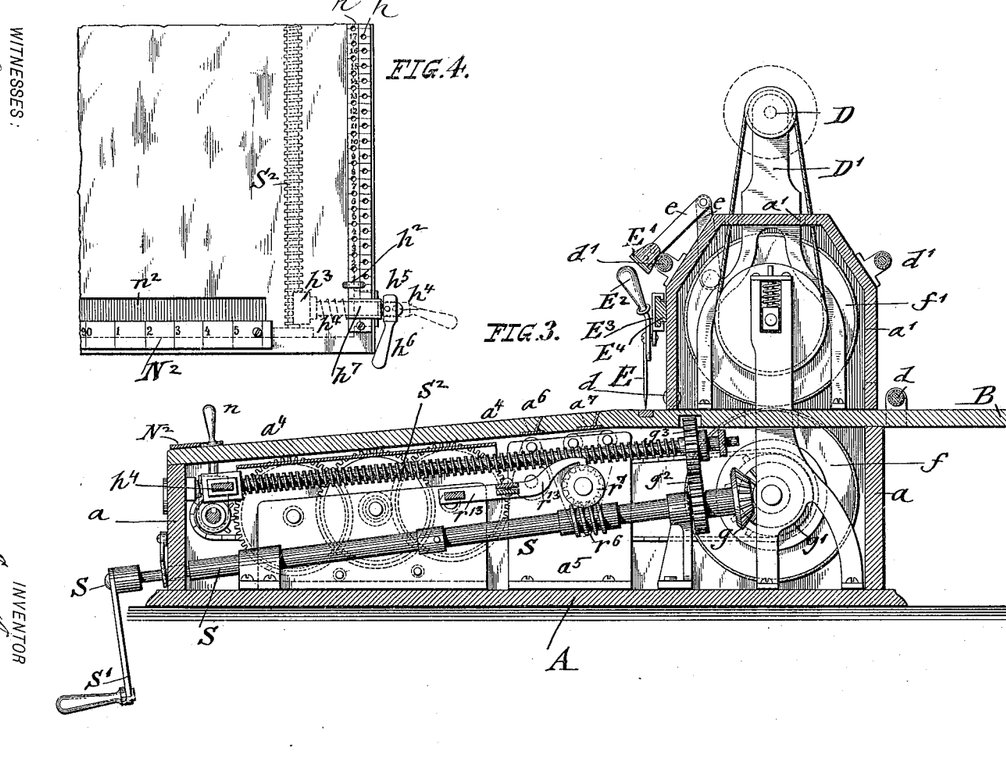
Fig. 3 is a vertical longitudinal section on line 3 3, Fig. 2.
Fig. 4 is a top view at the right-hand front corner of the apparatus, drawn on a larger scale.

Referring to the drawings, A represents the casing of my improved apparatus for measuring off textile fabrics and computing and registering the sales of the same. The casing A consists of a lower larger portion $a$ and an upper narrower detachable portion $a'$, which latter is supported on the rear part of the lower portion and attached thereto by means of hooks $a^2$, that are pivoted to the lower portion $a$ and adapted to engage keepers $a^3$ on the end walls of the smaller upper portion. A shelf B extends backwardly from the rear part of the casing $a$, said shelf or table serving for supporting the roll or package of goods from which a portion has been sold. At the interior of the rear part of the casing $a$ is arranged a feed-roller $f$, which is preferably covered with india-rubber, felt, or other suitable material and which projects through an opening $f^0$ in the top of the casing $a$, so as to form contact with a second rubber-covered feed-roller $f'$, the shaft of which is supported in suitable bearings of the casing $a'$, said bearings being spring-actuated, so that the upper roller $f'$ can "give" to some extent in vertical direction. The casing $a'$ is provided with longitudinal openings $f^2$ in its front and rear walls, in which or adjacent thereto are arranged guide-rollers $d$ $d$ for guiding the piece of textile fabric that is to be measured off and sold. Above the guide-rollers $d$ $d$ are arranged on the front and rear walls of the casing $a'$ additional guide-rollers $d'$, by which the fabric is guided to a winding-up roll D, that is supported in bearings of upright standards D', that are attached to the top of the casing $a$ and extended in upward direction through openings in the top of the casing $a'$, as shown in Fig. 3. The winding-up roll D may be made in the form of an ordinary wooden roller or core, which is supported in suitable bearings and on which the fabric to be measured off is wound, and which roller is removed from the fabric before wrapping it up. The guide-rollers $d\ d'$, which are arranged on the front and rear walls of the casing $a'$, serve for the purpose of guiding the fabric to be measured off from the front or rear part of the apparatus. When the fabric is to be measured off from the front part, the roll of fabric is placed on the top of the casing $a$ and passed between the feed-rollers $f\ f'$ and over the rear guide-rollers $d\ d'$ to the winding-up roll, as shown in full lines in Fig. 5, while when the measuring off is to be from the rear part toward the front the fabric to be measured off is placed on the shelf or table B, passed through the feed-rollers $f\ f'$, and over the front rollers $d\ d'$ to the measuring-off roll, as indicated in dotted lines in Fig. 5. In either case the winding-up roll, being formed of a detachable roller or tube, is removed with the fabric wound up on the same by releasing it from the centers $d^2$ and then handing it to the purchaser after being wrapped up either with or without the cores, according to the quantity and quality of the fabric sold.

Figure 1:
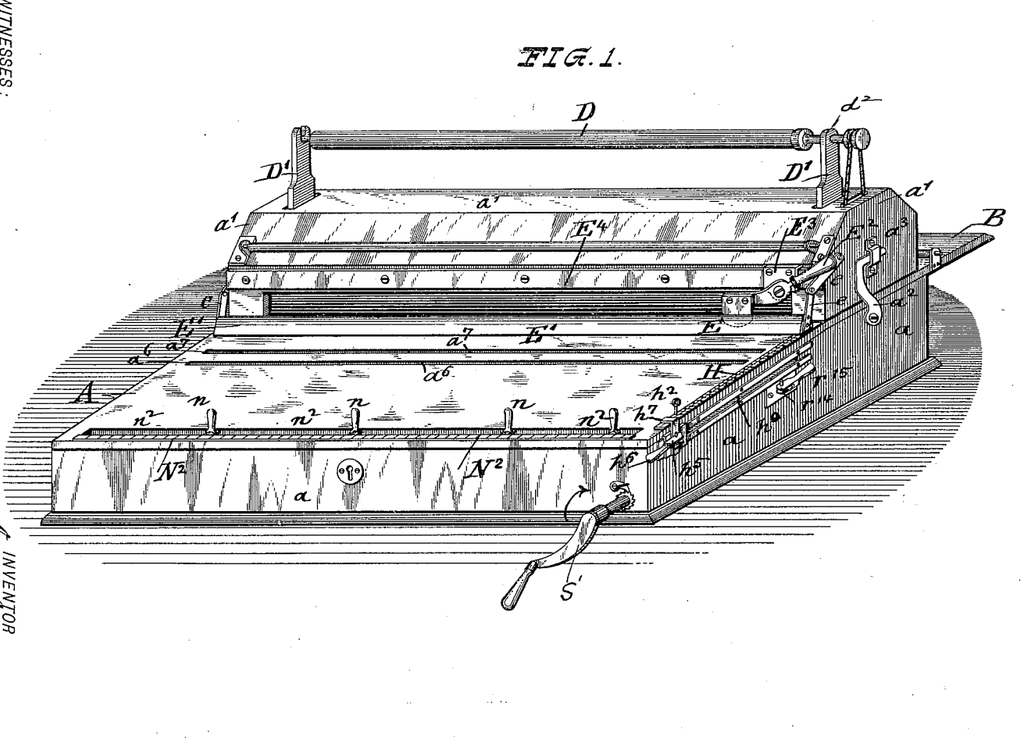
Figure 1 represents a perspective view of my improved apparatus for measuring off textile fabrics and computing and registering the sales of the same.
Figure 2:
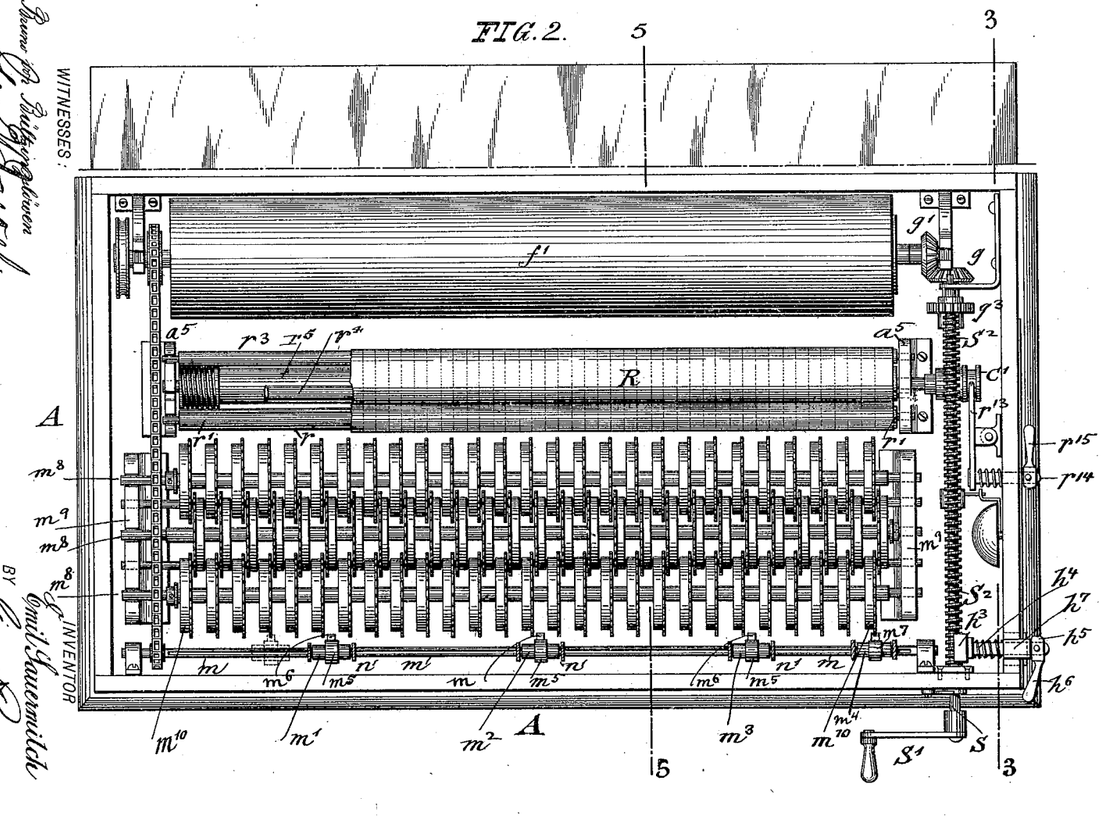
Fig. 2 is a plan view of the same with the top of the casing removed.
Figures 5, 6:
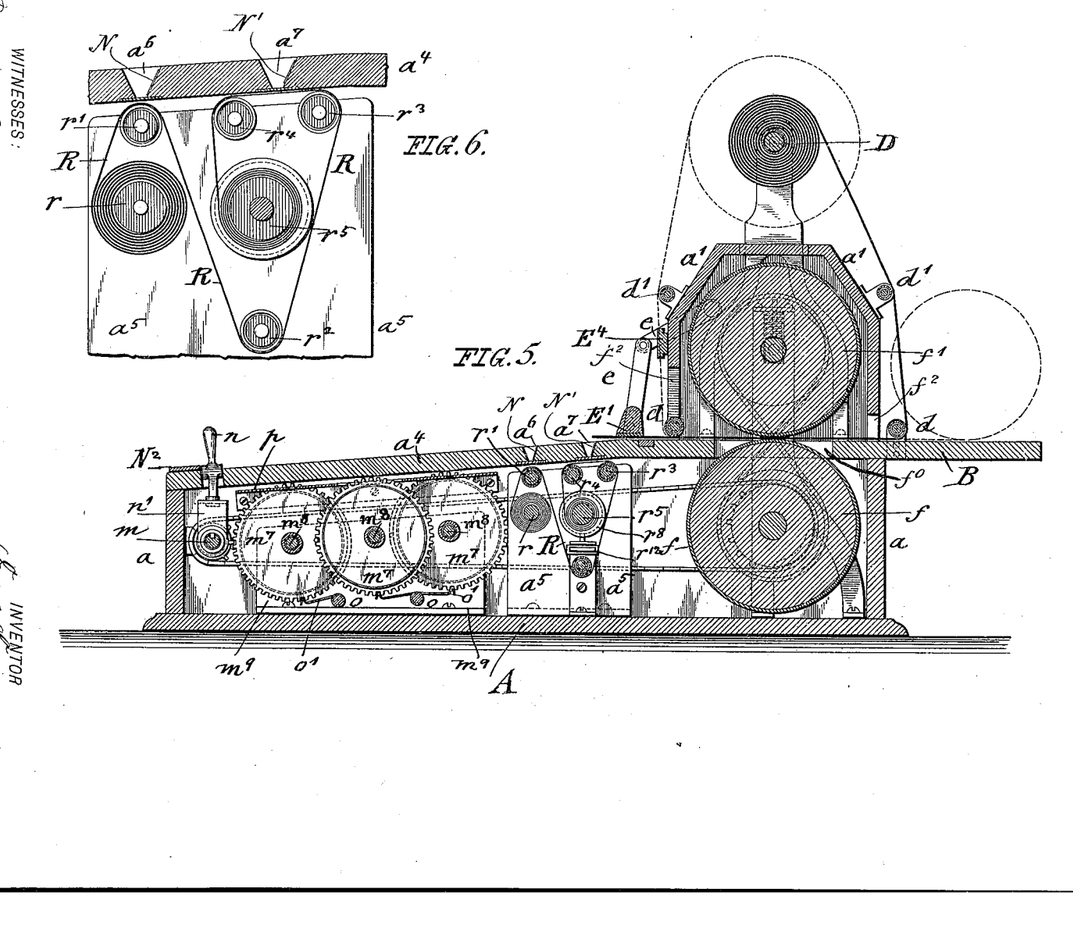
Fig. 5 is a vertical longitudinal section on line 5 5, Fig. 2.
Fig. 6 is a detail sectional side elevation showing the means for guiding the result-sheet.

Rotary motion is imparted to the feed-rollers $f\ f'$ in the required direction by means of an inclined shaft S, which is guided in inclined bearings arranged at the interior of the casing $a$, as shown in Fig. 3. The shaft S is extended through the front wall of the casing $a$ and provided at its front end with a crank S' and with a ratchet-and-pawl device by which the shaft is arrested and its motion in opposite direction prevented. A bevel-wheel $g$ is keyed to the rear end of the shaft S, said bevel-wheel meshing with a bevel-wheel $g'$ on the shaft of the lower feed-roller $f$, so that on turning the shaft S by the crank S' rotary motion is imparted to the feed-roller $f$. The rotary motion on the feed-roller $f$ is transmitted by a cross-belt and pulleys to the upper feed-roller $f'$, which moves in frictional contact with the lower roller, as shown in Fig. 5. A second belt-and-pulley transmission leads from the shaft of the upper feed-roller $f'$ to the shaft of the winding-up roll D, so that the same is moved simultaneously with the feed-rollers for producing the winding up of the fabric. At the right-hand side of the top part of the casing $a$ is arranged a scale H of yards and fractions thereof in connection with two rows of holes $h\ h'$, the holes of one row alternating with the holes of the other row, one row of holes being placed on the half and the other on the full yards, as shown in Fig. 4. When it is desired, a third row of holes may be arranged for the quarter-yards. A stop-pin $h^2$ is placed into one of the holes according to the length of fabric which is to be measured off. At the interior of the casing $a$, in proximity to and below the rows of holes, is arranged an inclined screw-spindle $S^2$, to which rotary motion is imparted by a gear-wheel transmission $g^2\ g^3$ from the crank-shaft S, said spindle being supported in suitable bearings of the casing $a$, as shown in Figs. 2 and 3. A threaded semicylindrical nut $h^3$ is adapted to mesh with screw-spindle $S^2$, the shank $h^4$ of the same being extended laterally to the outside of the casing $a$ and guided in a slot $h^0$ in the side wall of the casing perpendicular to the screw-spindle $S^2$. To the outer end of said shank is pivoted a cam $h^5$, having a handle $h^6$. An angular indicator $h^7$ is applied to the outer end of the shank $h^4$, said indicator projecting over the yard-scale arranged along the top edge of the casing $a$. When it is desired to cut off a certain length of fabric, the indicator $h^7$ is placed at the zero-point and the stop-pin $h^2$ in the hole of the yard-scale corresponding to the number of yards to be measured off. The cam-lever is then turned into the position shown in Figs. 1, 2, and 4, and thereby the nut $h^3$ placed in engagement with the threads of the screw-spindle $S^2$. The end of the fabric is placed between the feed-rollers $f\ f'$ and the crank S' turned, which produces the rotation of the feed-rollers and the forward feeding of the fabric between the same. The indicator $h^7$ is moved simultaneously over the yard-scale until it abuts against the stop-pin $h^2$ and is arrested thereby. As soon as the indicator $h^7$ abuts against the stop-pin $h^2$ the motion of the crank S' is discontinued, as the measuring off of the required length of fabric is completed. The length of fabric measured off is next cut off from the main portion of the fabric. The cutting operation is accomplished by a cutting-off device consisting of a cutting-off knife E, which is guided at the front part of the casing $a'$, and a straight-edge E', which is normally supported by toggle-levers $e\ e$ on the front wall of the casing $a'$ or which is lowered onto the fabric, so as to assume the position as shown, respectively, in Figs. 3 and 5. The straight-edge E' presses the fabric on the top of the lower casing $a$ and holds it firmly in position for the action of the cutting-off knife E, which is drawn along the edge of the straight-edge E'. The cutting-knife E is provided with a handle $E^2$ and fulcrumed to a slide-piece $E^3$, which slides along a grooved or dovetailed guide-rail $E^4$, as shown in Figs. 1 and 3. Below the edge of the cutting-knife is countersunk in the top of the casing $a$ a piece of compressed fiber or other suitable material, so as to produce a clear cut of the knife when the same is drawn over the fabric from one side of the apparatus to the other. After the fabric is cut off the remaining length of the same that is still held in stretched position between the guide-rollers $d\ d'$ and between the feed-rollers $f\ f'$ is then wound up on the roll D by hand. The distance between the cutting-off knife E and the contact point between the feed-rollers $f\ f'$ is of a determined length—say onequarter of a yard. After the cloth is cut off the stop-pin $h^2$ is removed and the crank-handle S' moved again, so that the cut-off end of the fabric clears the feed-rollers so that it can be wound up entirely on the roller or tube held on the shaft. In this manner the full length is given to the fabric, which is then removed, with the roller or core, from the machine, wrapped up, and delivered. The roller is then replaced in its centers of the shaft of the winding-up roll and the cam-lever, with its indicator, returned to the zero or starting point. This is accomplished by placing the cam-lever in position at right angles to the casing, as shown in dotted lines in Fig. 4, whereby the semicircular nut $h^3$ is moved out of engagement with the screw-spindle, so that no motion can be transmitted to the indicator.

The casing $a$ is closed by a detachable cover or lid $a^4$. At the interior of the casing $a$, adjacent to the feed-rollers $f\ f'$, are arranged the result-sheet R and its driving mechanism and in the front part of the casing the registering-disks and the actuating mechanism for the same.

The result-sheet is preferably made of tough paper or cloth and printed on both sides, respectively, along one edge with a column of figures indicating the lengths of the fabric to be cut off for every half-yard and with rows of figures at right-angles to said columns, said rows of figure being on one side of the sheet the products of the prices per yard and the length of fabric to be cut off when the price per yard is an even number, while on the opposite side said rows of figures are the products of the prices per yard and the lengths of fabric to be cut off when the price per yard is an odd or uneven number.

Figures 7, 8, 9, 10, 11:
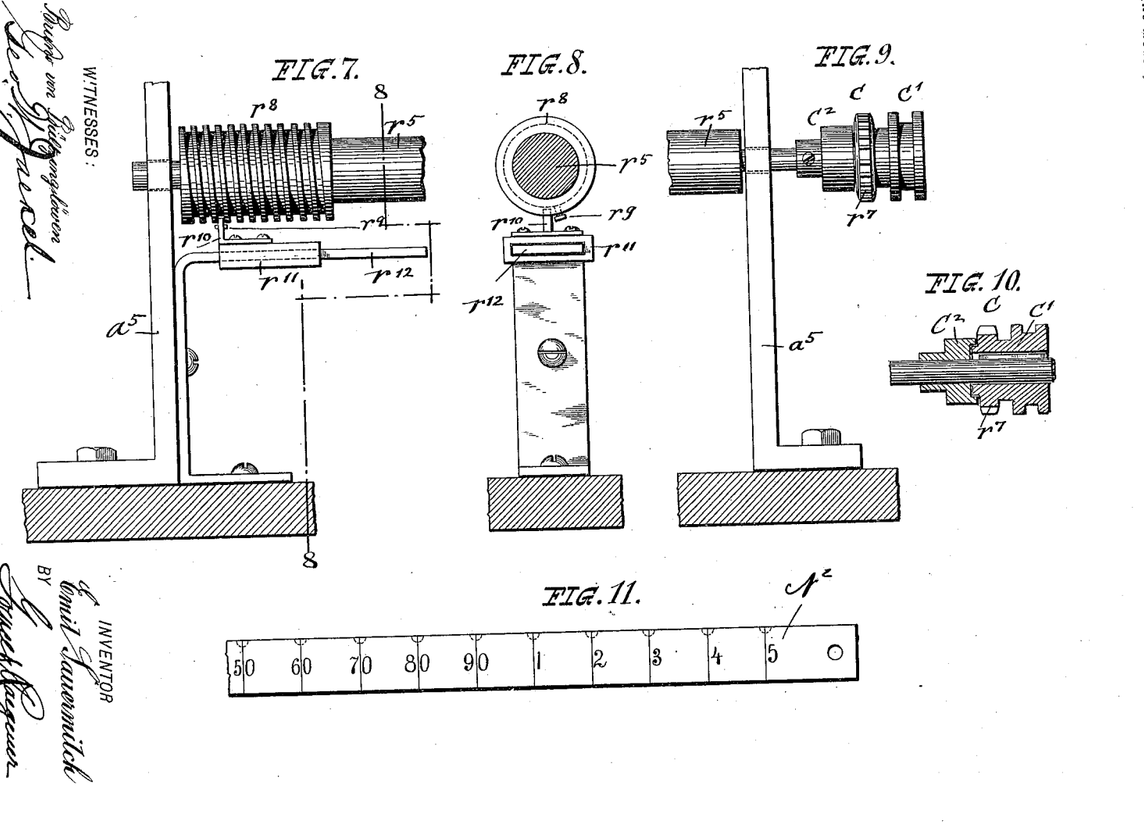
Figs. 7 and 8 are respectively a detail side elevation and a vertical transverse section, on line 8 8, Fig. 7, of the mechanism for returning the result-sheet to its normal or starting position.
Figs. 9 and 10 are respectively a side elevation and vertical central section of the clutch for starting or stopping the mechanism for moving the total-result sheet.
Fig. 11 is a top view of the index for the price of the goods per yard arranged alongside of the registering mechanism.
Figure 17:
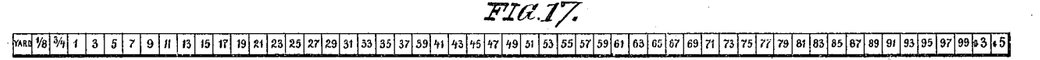
Figure 17A:
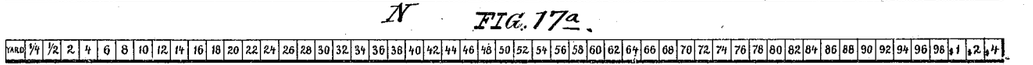

The result-sheet R is attached at one end to a roller $r$, which turns in suitable bearings of upright standards $a^5$, located in the casing $a$. The result-sheet R is then passed from the roller $r$ over a guide-roller $r'$ above the roller $r$, then in downward direction over a guide-roller $r^2$ at the lower part of the upright standards $a^5$, and then over a guide-roller $r^3$ at the upper part of standards and over a second guide-roller $r^4$ on a level with the rollers $r'$ and $r^3$ to the winding-up roller $r^5$, to which the opposite end of the result-sheet is permanently attached. Above the roller $r'$ is arranged in the cover $a^2$ an opening $a^6$ and between the rollers $r^3\ r^4$ a second opening $a^7$ for reading off the numbers on the result-sheet, one opening showing the even numbers, the other the uneven numbers on the other side of the result-sheet, which is so guided over the rollers $r^2\ r^3\ r^4$ that its opposite side is below the second opening $a^7$. Forward motion over the guide-rollers is imparted to the result-sheet R by a worm $r^6$ on the driving-shaft S, which worm meshes with a worm-gear $r^7$ on the shaft of the winding-up roller $r^5$. The roller $r$ is made in the nature of a spring-roller, such as are used for winding up shades, while the roller $r^5$ is provided at its opposite end with a screw portion $r^8$, Fig. 7. In one of the convolutions of the screw portion $r^8$ is inserted a stop-pin $r^9$, that serves to abut against a lug $r^{20}$, which is attached to a sleeve $r^{11}$, that is guided on a stationary arm $r^{12}$, located axially below and parallel with the roller $r^5$. On the shaft of the roller $r^5$ is arranged a clutch C, which is composed of a movable member C', that is splined to the shaft of the roller $r^5$ and carries the worm-gear $r^7$, and of a fixed member $C^2$, which is keyed to the shaft of the roller $r^5$, as shown in Figs. 9 and 10. The movable member C' is operated by a lever $r^{13}$, Figs. 2 and 3, that engages a circumferential groove of the same. The lever $r^{13}$ is fulcrumed to a lug at the inside of the casing $a$, its opposite end being connected with a spring-actuated rod $r^{14}$, which extends through a slot in the side wall of the casing $a$ to the outside of the same. The outer end of the spring-actuated rod $r^{14}$ is pivoted to a cam-lever $r^{15}$, which when placed alongside of the side wall of the casing $a$ holds the movable member of the clutch out of mesh with the fixed member $C^2$. When, however, the cam-lever $r^{15}$ is placed at right angles to the side wall of the casing $a$, the rod $r^{14}$ is drawn outwardly against the tension of its spring and the lever $r^{13}$ moved on its fulcrum, so that the worm-gear $r^7$ on the movable member C' of the clutch C is placed into mesh with the worm $r^6$ and the fixed member, so that rotary motion is imparted by the clutch from the driving-shaft S to the winding-up shaft $r^5$. It is necessary that the members of the clutch C be placed in mesh before the driving-shaft is rotated. As soon as the motion of the driving-shaft S is interrupted the row of figures on the result-sheet that indicates the price for an uneven fraction or multiple of yards that are to be measured off is below the opening $a^7$ in the cover $a^2$ of the casing, while the row of figures on the other side of the result-sheet R, which indicates the price for an even fraction or multiple of yards, is located below the opening $a^7$. The openings $a^6$ and $a^7$ are preferably made tapering and closed at the lower end by suitable glass plates, so that dust is excluded from the interior of the casing A. On the inclined rear sides of the openings $a^6$ and $a^7$ are located the price-strips N N', which are shown in Figs. 17 and 17$^a$ and on which are printed the prices per yard on one row from one-eighth of a cent per yard to five dollars per yard. On the corresponding row of figures on the result-sheet R appears below the openings $a^6\ a^7$ the price of the piece of fabric cut off. By "corresponding row of figures" is meant the length of the fabric, which is in the column of figures, appears conjointly through said openings with the price of the fabric cut off, which latter price is the product of the price per yard or fraction multiplied by the number of yards or fraction of a yard.

Figure 16:
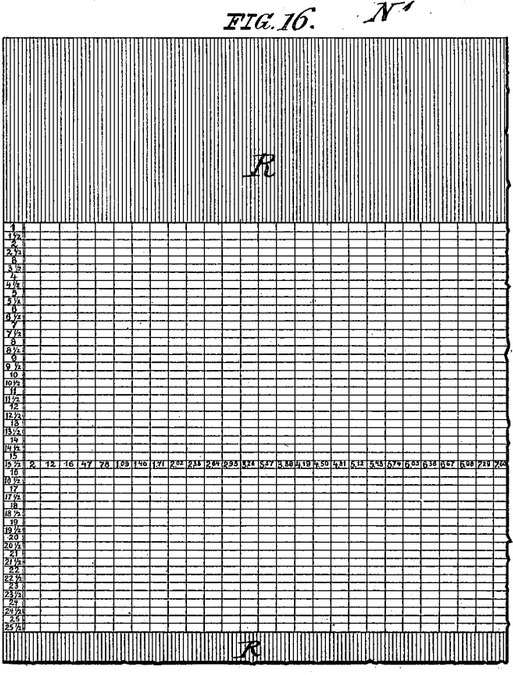
Figs. 16, 16$^a$, 17, and 17$^a$ are diagrams showing opposite sides of the result-sheet and the respective price-strips for the same.
Figure 16A:
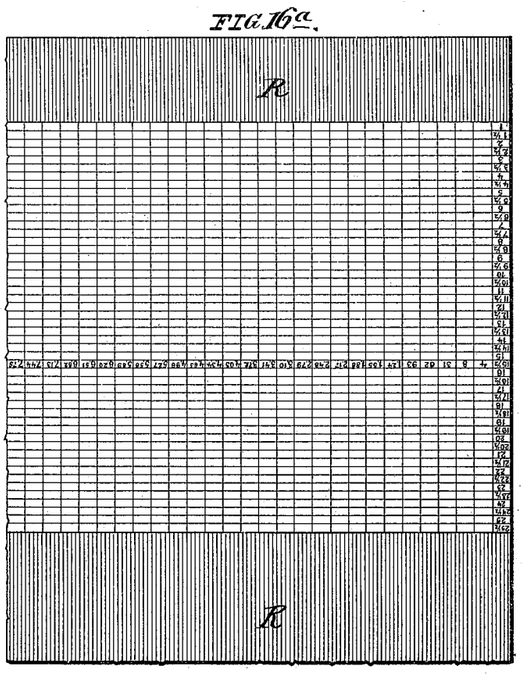

Figs. 16 and 16$^a$ illustrate the opposite sides of the result-sheet, the former showing that side on which appear the computed products of the price per yard or fraction multiplied by the number of yards to be cut off when the price per yard or fraction is odd or uneven, as shown on the price-strip, Fig. 17, and the other view, Fig. 16, showing that side on which appear the products of the price per yard or fraction multiplied by the number of yards to be cut off when the price per yard or fraction is even, as shown on the price-strip, Fig. $17^a$. When the number of yards to be measured off is to be fifteen and one-half, (see Fig. 16 in the column of figures,) the figures on the corresponding row of products directly show the price of such number of yards by taking or selecting such product as is in a line with or below the uneven price per yard on the price-strip shown in Fig. 17, at which uneven price per yard the fabric measured off is to be sold. The same method is used with respect to the side of the result-sheet shown in Fig. $16^a$ and the price-strip shown in Fig. $17^a$. The result—namely, the total price of the piece measured off—is read off, when the motion of the driving-shaft is stopped, from the rows of figures on the result-sheet, giving the products, which may then be located below the openings $a^6$ $a^7$ in the cover $a^4$, the price being thus directly given to the attendant, who can put it down immediately without requiring any mental or written calculation. As soon as this is accomplished the cam-lever of the clutch C is returned to its normal position, so that the movable member of the clutch is moved out of mesh with the worm-gear. As soon as this is accomplished the spring of the spring-roller $r$, which has been set to tension during the forward motion of the result-sheet, is called into action and the result-sheet unwound from the roller $r^5$ and wound up on the roller $r$ until the stop-pin $r^9$ in the helically-grooved portion $r^8$ is arrested by the lug $r^{10}$ on the slide-piece $r^{11}$. During the winding back of the result-sheet on the roller $r$ the sleeve $r^{11}$ is moved along the arm $r^{12}$ by the grooved portion $r^8$, engaging the lug $r^{10}$, until the stop-pin abuts against the lug $r^{10}$, which indicates that the result-sheet is returned into its normal or stationary position on the rollers $r$ $r^5$. The position of the stop-pin $r^9$ in the grooved portion $r^8$ corresponds to the position of the first row of price-figures on the result-sheet, which position is carefully determined by actual test before the stop-pin is secured in position in the grooved portion $r^8$. The sliding lug $r^{10}$ is then correspondingly adjusted, so that the stop-pin $r^9$ abuts against the same when the result-sheet is in its normal or starting position. During the return motion of the result-sheet as caused by the spring-roller $r$ the sliding lug $r^{10}$ moves along the convolutions of the grooved portion $r^8$ until arrested by the stop-pin $r^9$, when the motion of the result-sheet is likewise arrested, as it has been returned to its normal or starting point.

*The registering mechanism.*—The apparatus so far described can be used as a measuring, cutting-off, and price-computing device for textile fabrics. In many cases, however, it is necessary that the apparatus should also make a full register of all the sales and the total amount of the number of yards sold and the prices realized therefrom. For this purpose a special registering mechanism is arranged in the front part of the casing $a$, adjacent to the result-sheet-operating mechanism. (Shown in Fig. 2.) This registering mechanism, however, may also be arranged adjacent to the feed-rollers $f f'$ and the result-sheet mechanism arranged in the front part of the casing $a$, which latter arrangement would have the advantage that the openings for reading off the prices of the sales are brought closer to the front part of the casing $a$ and could be read off with greater facility by the attendant. In the working of the apparatus, however, it makes no difference which arrangement is adopted.

Figures 12, 13, 14, 15:
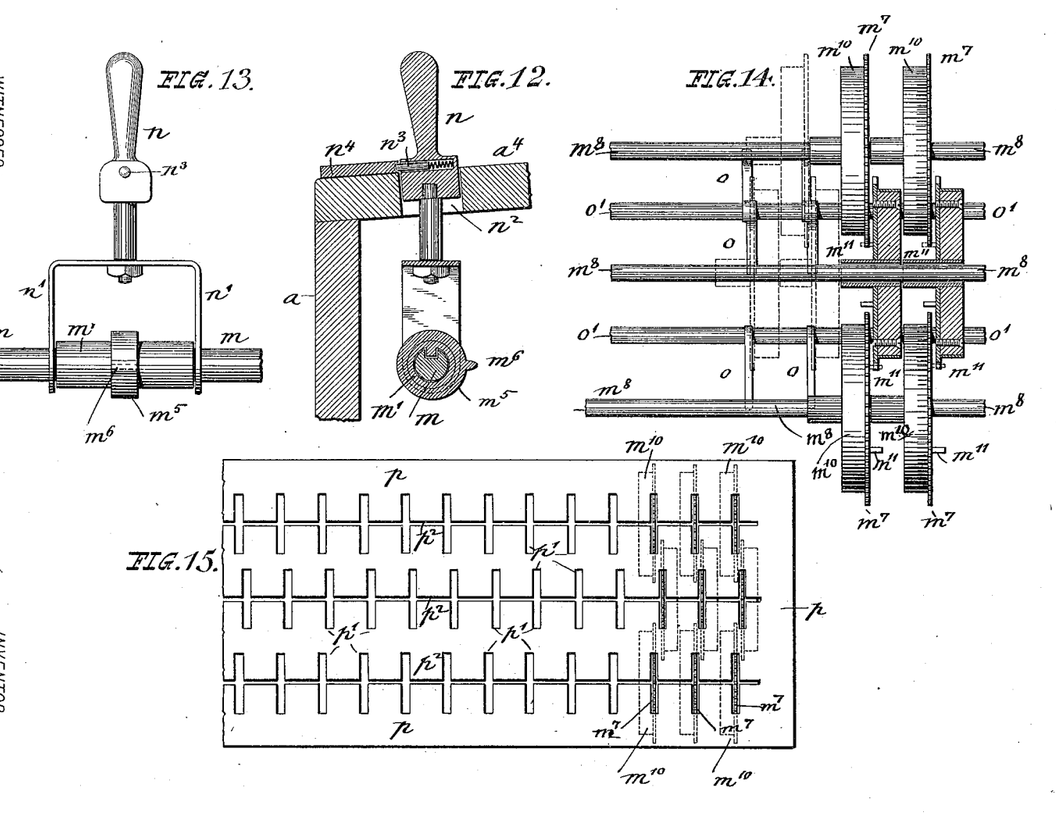
Fig. 12 is a detail vertical transverse section of the mechanism for actuating the individual registering devices.
Fig. 13 is a side elevation of Fig. 12.
Fig. 14 is a plan view, partly in horizontal section, of two sets of registering-disks.
Fig. 15, a top view of the slotted plate for covering the entire registering mechanism of my apparatus.

The registering mechanism receives its motion from a rotary shaft $m$, that turns in suitable bracket-bearings attached to the inside of the front wall of the casing $a$ and that receives motion from the shaft of the lower feed-roller $f$ by means of a sprocket-wheel and chain transmission, so as to turn with the lower feed-roller $f$. The sprocket-wheel on the shaft of the feed-roller $f$ is made with twice the number of teeth as the sprocket-wheel on the shaft $m$, so that the latter turns twice for each rotation of the feed-roller $f$. As each rotation of the feed-rollers $f f'$ produces the forward feeding of half a yard of the fabric, and as one rotation of the feed-rollers produces two rotations of the shaft $m$, the latter registers one full yard at each fourth rotation. The shaft $m$ is provided with a longitudinal groove, to which are splined four sliding sleeves $m'$, $m^2$, $m^3$, and $m^4$, each sleeve being engaged by the U-shaped lower end $n'$ of a handle $n$, the shank of which is guided in a slot $n^2$ in the top of the casing $a$, each handle being provided with a spring-actuated pin $n^3$, that engages depressions in the inner face of a stationary guide-rail $n^4$, arranged at the upper front edge of the casing $a$, as shown in detail in Fig. 12. On the said guide-rail is arranged a stationary price-strip $N^2$, which is subdivided from one-eighth cent to five dollars per yard, as shown in Fig. 11. The left-hand handle $n$ is intended to be set for registering the units or cents, the second handle the tens, the third handle for the one hundred cents or dollars, and the fourth handle serves for registering the total number of yards sold. Each sliding sleeve is provided with a central collar $m^5$, having a central projecting tooth $m^6$, which is placed into mesh with the gear-wheels $m^7$ of the first series of gear-wheels that are made to turn loosely on a shaft $m^8$, supported on upright standards $m^9$ at the inside of the casing $a$, as shown in Fig. 2. Alongside of each gear-wheel $m^7$ is arranged a disk $m^{10}$, which carries at its circumference the prices of the fractions or multiples of a yard of fabric. The handles $n$ are set in their respective positions on the price-strip $N^2$, so as to correspond with the units, tens, and hundreds of the price per yard. For instance, if the price be one dollar and twenty-five cents per yard, handles $n$ are placed, respectively, against the figures "5," "2," and "1" on the price-strip $N^2$, whereby the teeth $m^6$ are placed in mesh with the gear-wheels corresponding thereto, after which the apparatus is set in motion. The fourth handle $n$ is placed so that the tooth $m^6$ on its sleeve $m^4$ meshes with the gear-wheel indicating the number of yards sold. The teeth $m^6$ mesh with the corresponding gear-wheels, so that with each rotation of the shaft $m$ one tooth of each gear-wheel is engaged and the same moved at each rotation of the shaft for the distance of one tooth. Back of the first series $m^7$ of registering-wheels are arranged two additional shafts $m^8$, which carry two additional series of registering-wheels $m^{10}$, the middle series being placed sidewise of the first and third series. Each gear-wheel is provided with one hundred teeth, each tooth corresponding to one-fourth of a yard measured off, so that the full rotation of a gear-wheel of the first series will correspond to twenty-five yards when measured off. When the full rotation of either one of the gear-wheels of the first series is accomplished, a pin $m^{11}$ on the same engages the adjacent gear-wheel of the second series, which corresponds to one full rotation of the primary series—in other words, to twenty-five yards. When the gear-wheels of the second series are turned for one full rotation, two thousand five hundred yards are measured off. Then a pin on each gear-wheel of the second series engages with the adjacent gear-wheel of the third series, the full rotation of the latter corresponding to two hundred and fifty thousand yards. The figures on the disks adjacent to the gear-wheels indicate the corresponding prices of the quantities of yards measured off. The total amount of the prices read off on the registering-disks has to correspond with the total amount of the individual sales computed by means of the result-sheet. All the gear-wheels and registering-disks are covered by a sheet-metal plate $p$, which is provided with short transverse slots $p'$, through which the teeth of the gear-wheels project, as well as with longitudinal slots $p^2$, through which the figures on the disks can be read off when the top of the casing is removed. As the top of the casing is locked, the attendant has no access to the registering-disks, which can only be inspected by the party having the key. The registering-disks furnish a reliable controlling device for the total sales made and of the total number of yards measured off by the apparatus. If, for instance, the total amount of the sales is read off at every week, this total amount must correspond to the total number of individual sales made—that is to say, of the yards measured off, cut off, and computed by the apparatus. To prevent the overrotation of the registering-disks under the action of the projecting teeth $m^6$ and motion-transmitting pins on said disks, the gear-wheels of the registering-disks are engaged by check-springs $o$, which are attached to transverse rods $o'$, supported by the upright standards $m^9$, below the gear-wheels, as shown in Figs. 5 and 14. These check-springs secure the reliable turning of the gear-wheels and registering-disks.

Operation: From the foregoing description the operation of the apparatus can be readily understood. In preparing the same for operation for each sale the fabric is first inserted between the friction-rollers $f\ f'$. The stop-pin $h^2$ is then placed in the hole corresponding to the number and fraction of yards to be cut off. The nut $h^3$ is then pressed into mesh with the screw-spindle $s^2$ by placing the cam-lever $h^6$ at right angles to the side wall of the casing $a$. The clutch of the driving mechanism of the result-sheet R is then placed into mesh with the shaft of the winding-up roller $r^5$ by moving the lever $r^{15}$ at right angles to the side wall of the casing $a$. The handles $n$ of the registering mechanism are then placed into their proper positions at the units, tens, and hundreds of the price-strip $N^2$, and according to the price per yard of the fabric to be measured off. The crank S is then turned. Owing to the ratchet and pawl on the driving-shaft it can only be turned in the direction of the arrow shown in Fig. 1. The crank is then turned until the indicator $h^7$ abuts against the stop-pin $h^2$. When the turning is discontinued, the straight-edge, is then moved down and pressed on the fabric and the knife moved along the straight-edge, and thereby the piece of fabric measured cut off. After the fabric has been fed to a sufficient length through the feed-rollers it is attached to the core or tube of the winding-up roller and is then wound up automatically thereon as the operation of the apparatus proceeds. When the indicator has arrived at the stop-pin, the stop-pin is removed and returned into its normal position and the crank turned sufficiently until the fabric is released from the feed-rollers. The winding-up roller or tube is then removed from its supporting-centers and the remaining end of the fabric wound up by hand and then wrapped up in suitable wrapping-paper and delivered to the customer. The straight-edge is next returned to its raised position, (shown in Fig. 3,) so as to rest on one of the guide-rollers, and the knife is returned to its normal position at the left-hand side of the apparatus, the indicator to its normal position at the right-hand front end of the apparatus, and the clutch of the result-sheet, actuating mechanism released, so that the result-sheet is wound again upon the roller $r$. After each quantity is measured off the price is read off directly on the even or uneven columns of the result-sheet, as the case may be, noted on the sales-register, and one copy delivered to the purchaser, while the other copy forms the register of the selling firm.

The apparatus described forms a very useful apparatus for measuring and cutting off fabrics and computing and registering their sales in dry-goods and other stores. One apparatus may be used for every counter or for every two counters, according to the frequency of the sales made. After a sale is made the sales-girls have no further business with the measuring, cutting off, computing, and delivering of the goods. It will thereby facilitate the sale of textile fabrics to a considerable extent and keeps at the same time a very effective and reliable control on the sales.

The apparatus can also be used for taking stock by passing the unsold fabrics on hand through the end rolls and noting down the number of yards in each price and its value according to the price per yard fixed for the remnants.

Having thus described my invention, what I claim is—

1. The combination of fabric-feeding mechanism, a fabric-supporting plate or surface, a movable straight-edge, normally supported at a suitable distance above and away from the said plate or surface, a cutting-knife mounted on a guide between the normal raised position of the straight-edge and the said plate or surface, and means for lowering the straight-edge, so as to clear the cutting-knife and move it down upon the said plate or surface, alongside the cutting-knife, substantially as set forth.

2. The combination of fabric-feeding mechanism, a casing provided with a fabric-supporting plate or surface, a straight-edge, between which and the supporting plate or surface the fabric to be cut is fed, toggle-levers pivoted to the casing and constructed so as to support the straight-edge, normally at a suitable distance above said plate or surface, and a cutting-knife mounted on a guide between the normal raised position of the straight-edge and the said plate or surface, said toggle-levers being adapted to lower the straight-edge, so as to clear the cutting-knife and move it down upon the said plate or surface, alongside the cutting-knife, substantially as set forth.

3. The combination, with fabric-feeding mechanism, of a straight yard-scale provided with alternating rows of holes, a stop-pin adapted to be inserted into either of said holes, a sliding indicator, a screw-spindle parallel with said yard-scale and means for turning said screw-spindle for moving the indicator along and parallel with said scale, simultaneously with the motion of the feed-rolls, substantially as set forth.

4. The combination, with fabric-feeding mechanism, of a straight yard-scale provided with a series of holes, a stop-pin adapted to be inserted into one of said holes, a sliding indicator, a spring-actuated shank on which said indicator is mounted, a half-nut on said shank, a screw-spindle with which the threads of said half-nut are adapted to mesh, means for rotating said screw-spindle, and a cam-lever pivoted to said shank for moving the half-nut out of engagement with the screw-spindle, substantially as set forth.

5. The combination, with a rotary shaft provided with a worm, a roller having a worm-wheel meshing with said worm, a spring-actuated roller, a result-sheet, and means for guiding the result-sheet to said rollers, said result-sheet being provided with rows of figures indicating the price for any given number of yards of fabric, of a screw-spindle, gearing connecting the latter and the said shaft, an indicator adapted to be moved by and parallel with said screw-spindle, and a stop against which the indicator abuts and arrests the motion of the spindle, shaft and result-sheet, substantially as set forth.

6. The combination, with a casing provided with two openings, and price-strips, one arranged at one side of each of said openings and graduated so as to indicate the price per yard for odd and even numbers, respectively, of a result-sheet provided on both sides with a column of figures and rows of figures arranged at right angles to said column, the columns of figures representing the number of yards and fractions thereof which may be measured off, and the rows of figures on one side indicating the products of a certain number of yards, shown in the said column at the end of the row, multiplied by an uneven price per yard, as shown on the corresponding price-strip, and the rows of figures on the opposite side, indicating, in the same way, products of a certain number of yards multiplied by an even price per yard, substantially as set forth.

7. The combination, with mechanism for measuring textile fabrics, of a result-sheet moving in connection with said mechanism, said result-sheet being applied to an unwinding spring-roller, a winding-up roller and guide-rollers, mechanism for actuating the result-sheet simultaneously with the measuring mechanism, a clutch device for starting or stopping the actuating mechanism, and mechanism for automatically returning the result-sheet to its initial or starting position, when the actuating mechanism is stopped, substantially as set forth.

8. The combination, with mechanism for measuring textile fabrics, of a result-sheet provided with rows of figures for indicating the computed price of determined lengths of fabric, means for imparting motion to said result-sheet simultaneously with the feed motion imparted to the fabric, means for arresting the result-sheet when the required quantity is measured off, and means for returning the result-sheet to its initial position after the computed price has been read off, substantially as set forth.

9. In a machine for measuring textile fabrics and computing the quantity sold, the combination of a result-sheet provided with rows of figures at opposite sides, indicating the total price of the quantity measured off, an unwinding spring-roller to which one end of said result-sheet is attached, a winding-up roller to which the other end is attached, guide-rollers for said result-sheet, means for imparting motion to the winding-up roller, means for arresting the motion of the return-sheet after the required length of fabric is measured off and means for automatically returning the result-sheet to its initial or starting position on the unwinding and winding-up rollers, substantially as set forth.

10. The combination, with mechanism for measuring determined quantities of textile fabrics and mechanism for computing the price of the fabric measured off, of a registering mechanism for the total value of sales made in a certain time and the yards cut off in the same time, said registering mechanism consisting of registering-disks, means for rotating the same simultaneously with the measuring and computing mechanisms, and devices for calling the required sets of registering-disks into action, substantially as set forth.

11. The combination, of means for measuring off textile fabrics, means for computing the price of the same, means for registering the total value of the sales made in a certain time and number of yards cut off in same time, said registering mechanism consisting of registering-disks, gear-wheels for actuating the same, adjustable sleeves provided with engaging teeth for calling the different sets of registering-disks into action, and a transmitting-shaft for imparting motion to said sleeves, substantially as set forth.

12. In apparatus for measuring textile fabrics and computing the price of the same, a registering mechanism for registering the total amount of sales, consisting of a number of registering-disks, intermeshing gear-wheels for rotating the same, check-springs for preventing the overrotation of said registering-disks, adjustable sleeves provided with teeth for engaging the required sets of registering-disks, a rotary shaft for imparting motion to said sleeves, and handles for setting the sleeves along a stationary price-strip, substantially as set forth.

13. In apparatus for measuring textile fabrics and computing the price of the same, a result-sheet provided on both sides with a column of figures located at one edge and rows of figures arranged at right angles to and in parallel columns with said column, the columns of figures progressively representing the number of yards and fractions thereof, which may be measured off, and the rows of figures on one side indicating the products of a certain number of yards, shown in the said column at the end of the row, multiplied by an uneven price per yard, and the rows of figures on the opposite side indicating, in the same way, products of a certain number of yards multiplied by an even price per yard, substantially as set forth.

In testimony that I claim the foregoing as my invention I have signed my name in presence of two subscribing witnesses.

EMIL SAUERMILCH.

Witnesses:
PAUL GOEPEL,
GEO. W. JAEKEL.